(12) United States Patent
Iyengar

(10) Patent No.: US 9,212,299 B2
(45) Date of Patent: Dec. 15, 2015

(54) COATED RELEASE LINER SUBSTRATE

(75) Inventor: Gopal Iyengar, Stevens Point, WI (US)

(73) Assignee: NEWPAGE CORPORATION, Miamisburg, OH (US)

( * ) Notice: Subject to any disclaimer, the term of this patent is extended or adjusted under 35 U.S.C. 154(b) by 722 days.

(21) Appl. No.: 12/945,317

(22) Filed: Nov. 12, 2010

(65) Prior Publication Data

US 2012/0121893 A1 May 17, 2012

(51) Int. Cl.
*B32B 29/00* (2006.01)
*B32B 27/12* (2006.01)
*B32B 5/00* (2006.01)
*B32B 5/16* (2006.01)
*B32B 9/04* (2006.01)
*C08K 3/34* (2006.01)
*C09J 7/02* (2006.01)

(52) U.S. Cl.
CPC ............... *C09J 7/0228* (2013.01); *C08K 3/346* (2013.01); *C09J 2400/283* (2013.01); *C09J 2413/005* (2013.01); *Y10T 428/254* (2015.01); *Y10T 428/27* (2015.01); *Y10T 428/277* (2015.01); *Y10T 428/31663* (2015.04)

(58) Field of Classification Search
CPC ............... C09J 7/0228; C09J 2400/283; C09J 2413/005; C08K 3/346; Y10T 428/254; Y10T 428/277; Y10T 428/31663
USPC .................................................. 428/323, 340
See application file for complete search history.

(56) References Cited

U.S. PATENT DOCUMENTS

| | | |
|---|---|---|
| 4,533,600 A | 8/1985 | Coughlan et al. |
| 5,084,354 A | 1/1992 | Krankkala et al. |
| 5,432,006 A | 7/1995 | Kessel et al. |
| 5,468,824 A | 11/1995 | Togashi et al. |
| 5,558,913 A | 9/1996 | Sasaki et al. |
| 5,650,453 A | 7/1997 | Eckberg et al. |
| 5,866,261 A | 2/1999 | Kerr, III et al. |
| 5,925,432 A | 7/1999 | Kian et al. |
| 5,948,870 A | 9/1999 | Jang et al. |
| 5,985,075 A | 11/1999 | Freedman |
| 6,159,595 A * | 12/2000 | Sumi .............................. 428/336 |
| 6,203,067 B1 | 3/2001 | Shipston et al. |
| 6,231,922 B1 | 5/2001 | Kline |
| 6,306,475 B1 | 10/2001 | Stocq et al. |
| 6,403,190 B1 | 6/2002 | Casey et al. |
| 6,884,468 B1 | 4/2005 | Abundis et al. |
| 7,622,159 B2 | 11/2009 | Mertz et al. |
| 2004/0101679 A1 | 5/2004 | Mertz et al. |
| 2005/0039871 A1* | 2/2005 | Urscheler et al. ............. 162/135 |
| 2008/0095948 A1 | 4/2008 | Sugita et al. |
| 2008/0193696 A1* | 8/2008 | Hayes .......................... 428/41.8 |
| 2008/0318010 A1 | 12/2008 | Wozniak et al. |
| 2010/0178523 A1* | 7/2010 | Iyengar et al. ................. 428/458 |
| 2011/0259917 A1* | 10/2011 | West et al. ..................... 222/107 |

FOREIGN PATENT DOCUMENTS

| | | |
|---|---|---|
| WO | 2004/074386 | 9/2004 |
| WO | WO 2009/005947 * | 1/2009 |
| WO | 2009/117637 | 9/2009 |
| WO | 2009/147283 | 12/2009 |

OTHER PUBLICATIONS

PCT, International Search Report and Written Opinion, International Application No. PCT/US2011/059505 (Jan. 18, 2012).
Product information, "Release Coatings, Silcolease® PC-267," by Bluestar Silicones (Aug. 2008).
Product information, "SILCOLEASE® release coatings . . . using science to a fine art," by Bluestar Silicones (date of first publication unknown).
"Material Safety Data Sheet, SILCOLEASE PC-950," by Bluestar Silicones (Dec. 20, 2006).
"Quick product updates," PFFC (Paper, Film & Foil Converter) (2008).

* cited by examiner

*Primary Examiner* — Samir Shah
(74) *Attorney, Agent, or Firm* — Thompson Hine LLP

(57) ABSTRACT

Release liner substrates and release liners produced therefrom wherein the substrate includes a coating layer containing a binder and a hyperplatey talc. The release liner may comprise a release liner substrate with a binder and a hyperplatey talc coating and a silicone coating applied to the substrate coating. In accordance with certain aspects, the binder may comprise a carboxylated latex binder.

15 Claims, No Drawings

COATED RELEASE LINER SUBSTRATE

FIELD

The present application relates to release liner substrates and to release liners formed therefrom wherein the substrate includes a coating containing a binder and a hyperplatey talc.

BACKGROUND

Release compositions are used, for example, to coat papers or films that are used as release backing sheets overlying the pressure-sensitive adhesive layer used in pressure-sensitive adhesive (PSA) products such as labels, decals, tapes, etc. The pressure-sensitive adhesive adheres to the release coated surface of the release liner sufficiently to enable the pressure-sensitive products to be handled prior to use. The liner is removed immediately prior to application of the pressure-sensitive adhesive product to another surface.

Furthermore, the release liner serves to facilitate cost-effective manufacture of rolls or sheets of pressure-sensitive products such as labels. It also functions as a carrier for labels for dispensing in automatic labeling operations and for computer printing and various applications. The performance attributes of a release liner are critical to both the manufacture and end-use application of pressure-sensitive adhesive products.

Typically, the release liner is provided as a silicone layer on a support layer having high hold out (i.e., the support layer on which the silicone layer is deposited is resistant to silicone penetration). The paper substrates typically utilized for producing release liners include super calendered Kraft paper, glassine and clay coated (coated one side or coated two side) products.

Silicone release systems can be applied to a suitable substrate using either solvent based or solventless formulations. Conventional substrates typically exhibit good silicone holdout, but only medium to poor levels of silicone cure. Incomplete cure of the silicone coating can result in unreacted silicone compounds in the release liner that can migrate onto an adjacent surface such as an adhesive or the back side of the support substrate. For example, unreacted or non-crosslinked silicone compounds present in a partially cured silicone release layer can migrate onto an adjacent adhesive layer and reduce its adhesive properties. Silicone migration or volatilization is also problematic for silicone-sensitive end uses. Silicones can transfer to the back side of the liner substrate stored in roll form resulting in a surface that is difficult or impossible to print. Moreover, any uncured silicone that transfers to the back side of the support substrate can re-transfer to another substrate which has been adhesively or otherwise laminated to the release liner. This re-transfer of uncured silicone can also cause printing problems such as poor adhesion or non-wetting of the ink.

SUMMARY

The present application relates to release liner substrates and release liners produced therefrom wherein the substrate includes a coating layer containing a binder and hyperplatey talc. The release liner comprises a release liner substrate with the hyperplatey talc coating and a silicone coating applied to the substrate coating. In accordance with certain aspects of the present invention, the release liner exhibits better cure and anchorage of the silicone coating composition. Furthermore, in accordance with other embodiments of the present invention, the silicone coating composition can be applied at reduced coat weights compared to conventional release liners and still provide sufficient hold out of the silicone coating and release thereof. Because silicone compositions can be expensive, the ability to reduce coat weights without adversely affecting release properties can reduce raw material costs.

In accordance with other aspects of the present invention, silicone release liners can be produced having significantly reduced amounts of total extractables, which are characteristic of incomplete cure of the silicone system. In accordance with certain embodiments of the present invention, release liners can be produced having extractables of less than 5%, more particularly less than about 3% and in accordance with particular embodiments, less than about 2%.

As a result of significantly reduced amounts of total extractables in the release layer, the release liners, in accordance with certain aspects of the present invention, can exhibit minimal or substantially no silicone transfer to adjacent surfaces, such as the back side of the support substrate, adjacent adhesive layers, and the like. This, in turn, can provide several advantages, such as minimizing the reduction of adhesive properties of adjacent adhesive layers due to silicone transfer; minimizing the development of printing problems on face stock due to silicone contamination; minimizing or eliminating silicone migration; and the like.

The present application also describes methods for making release liner substrates and release liners utilizing a surface coating composition containing hyperplatey talc. In accordance with this aspect of the present invention, a substrate base is coated with a coating composition containing a binder and a hyperplatey talc to produce a coated release liner substrate. The coated release liner substrate is then subsequently coated with a silicone release coating composition which is then cured to produce the finished release liner. Any of the types of curable silicone release materials can be used in accordance with the present invention. The resultant silicone-coated substrate is then exposed to radiation, such as ultra-violet radiation or electron beam radiation, under conditions sufficient to substantially cure the radiation curable silicone release agent to form a radiation cured silicone release coating.

DETAILED DESCRIPTION

The present invention relates to a release liner substrate comprising a substrate base coated with a coating composition comprising a binder and a hyperplatey talc. In accordance with certain embodiments, the hyperplatey talc improves holdout of a subsequently applied silicone release composition. Furthermore, the silicone release compositions applied to the coated substrate described herein may exhibit improved curing as indicated by a reduction in extractables from the cured coating composition.

As used herein, the term "hyperplatey talc" refers to talcs having higher than normal aspect ratios. The aspect ratio of a talc particle is defined as the diameter of the particle divided by its thickness. In accordance with certain embodiments, hyperplatey talcs have an aspect ratio of 50:1 to 1000:1, more particularly, from about 60:1 to about 200:1, and in accordance with certain embodiments, from about 65:1 to about 100:1. Although not wishing to be bound, it is believed that the thin platey structures associated with the hyperplatey talc improve holdout of the silicone coating composition due to the tortuosity resulting from the structure of the talc. The improved holdout may provide for better release liner performance at a reduced coat weight with respect to the base coating as well as reduced coat weights for the silicone release coating. Hyperplatey talc also exhibits low porosity compared to conventional pigments, which is also a factor in improving silicone holdout. Due to its nonpolar surface, talc is characterized by relatively low surface energy, which is conducive to silicone wetting, and provides for improved silicone anchorage. Silicone release liners prepared in accordance with certain aspects of the present invention exhibit fewer issues with respect to silicone rub off because of the improved anchorage that can be achieved using the hyperplatey talc in the base coating composition.

The hyperplatey talc useful in accordance with certain aspects of the present invention has a particle size of at least 5 microns, more particularly at least about 8 microns, and in accordance with certain aspects of the present invention, the hyperplatey talc has a particle size of at least about 10 microns.

The phrase "silicone coating" refers to a coating provided on the release liner substrate that functions as a release surface. In general, the silicone coating can be characterized as a cured coating or a dried coating. The phrase "silicone composition" refers to a composition that can be applied to a release liner substrate to form a silicone coating once the silicone composition has cured, dried or both cured and dried. The silicone composition can include water as a carrier, an organic solvent as a carrier, or it can be characterized as solventless. Once the silicone composition has been applied as a coating and allowed to dry or cure, it can be characterized as a silicone coating. The silicone composition can be characterized as a polysiloxane composition.

The release liner substrate can be selected so that it has properties that are desirable for a release liner. In general, a release liner should be sufficiently processable so that it can be processed through a print station or marking system for application of an ink or printing material thereto, and subsequently processed for receipt of a material or substance thereto for subsequent removal. If the substrate is too flimsy or too rigid, it may be difficult to handle.

Exemplary substrates that can be used as the release liner substrate include paper, clay coated paper, polymer coated paper, etc. Paper can be a particularly useful substrate because paper provides dimensional stability and a desired weight and texture for subsequent processing for printing and for subsequent application of a material or substance onto the release liner. In addition, a paper substrate can be prepared from renewable resources.

The paper substrate can be prepared from natural fiber, synthetic fiber, or a mixture of natural fiber and synthetic fiber. Natural fiber refers to fiber formed from plants or animals. Natural fibers are not fibers that are formed as a result of extrusion or spinning. The natural fibers can be obtained from a source of fiber using techniques such as chemical pulping, chemical mechanical pulping, semi chemical pulping, or mechanical pulping. Natural fibers from plants are often referred to as cellulosic fibers. Exemplary natural fibers that can be used to form the base sheet include wood fibers and non-wood natural fibers such as vegetable fibers, cotton, various straws (e.g., wheat and rye), various canes (e.g., bagasse and kenaf), silk, animal fiber, (e.g., wool), grasses (e.g., bamboo, etc.), hemp, corn stalks, abaca, eucalyptus, etc. Examples of synthetic fibers that could be used for the substrate include polyacrylic fiber, polyethylene fiber, polypropylene fiber, polylactide fiber, rayon, and nylon fiber.

Wood fiber can be obtained from wood pulp, which can include hardwood fibers, softwood fibers, or a blend of hardwood fibers and softwood fibers. The pulp can be provided as cellulose fiber from chemical pulped wood, and can include a blend from coniferous and deciduous trees. By way of example, wood fibers can be from northern hardwood, northern softwood, southern hardwood, southern softwood, or any blend thereof. Hardwood fibers tend to be more brittle but are generally more cost effective for use because the yield of pulp from hardwood is higher than the yield of pulp from softwood. Softwood fibers have desired paper making characteristics but are generally more expensive than hardwood fibers.

The natural fibers can be extracted with various pulping techniques. For example, mechanical or high yield pulping can be used for stone ground wood, pressurized ground wood, refiner mechanical pulp, and thermomechanical pulp. Chemical pulping can be used incorporating Kraft, sulfite, and soda processing. Semi-chemical and chemi-mechanical pulping can also be used which includes combinations of mechanical and chemical processes to produce chemi-thermomechanical pulp. Natural fibers can be bleached or unbleached.

The pulp can include a recycle source for reclaimed fiber. Exemplary recycle sources include post-consumer waste (PCW) fiber, office waste, and corrugated carton waste. Post-consumer waste fiber refers to fiber recovered from paper that is recycled after consumer use. Office waste refers to fiber obtained from office waste, and corrugated carton waste refers to fiber obtained from corrugated cartons. Additional sources of reclaimed fiber include newsprint and magazines. Reclaimed fiber can include both natural and synthetic fiber.

The refining of the fibers can be selected to enhance formation and fiber development. The level of fiber refining can be selected to help reduce penetration of the silicone composition into the paper substrate. In general, the silicone composition can be relatively expensive and it is desirable to reduce absorption of the silicone composition into the paper substrate. As a result, refining the fibers can help reduce penetration of the silicone composition into the paper substrate, and can help hold the silicone composition as a release layer on the paper substrate.

The paper substrate can be provided having a weight that enables the release liner to be processed through printing equipment and subsequent application of a material or substance thereto. For example, the paper substrate can be provided having a basis weight of about 20 lb/3,000 ft$^2$ to about 150 lb/3,000 ft$^2$. The paper substrate can be provided having a basis weight of about 25 lb/3,000 ft$^2$ to about 120 lb/3,000 ft$^2$, about 40 lb/3,000 ft$^2$ to about 80 lb/3,000 ft$^2$, or about 50 lb/3,000 ft$^2$ to about 70 lb/3,000 ft$^2$.

The porosity of the paper substrate can be controlled by surface treatment of the paper substrate to close up pores. Closing the pores of the paper substrate can be desirable to reduce the penetration of the silicone composition into the paper substrate. By reducing the penetration of the silicone composition into the paper substrate, it is possible to enhance or increase the amount of silicone composition remaining of the surface of the paper substrate and thereby use less silicone composition than if the silicone composition penetrates into the paper substrate. Exemplary surface treatments that can be used to help reduce penetration of the silicone composition into the paper substrate include machine calendering and super calendering. The finish on the paper substrate can be provided as a machine finish, a machine glazed finish, a clay coating. In addition, the paper substrate can be provided as a glassine sheet.

The release liner substrate in accordance with the present application is treated with a base coating composition comprising a binder and hyperplatey talc. Binders useful in accordance with the present invention include those binders typically used for paper coating compositions. Latex binders are particularly useful. Examples of useful latex binders include, but not limited to, styrene-butadiene, ethylene acrylic acid (EAA) copolymers, polyvinyl acetate, acrylics, vinyl-acetate, ethylene-vinyl chloride, and urethanes. Styrene-butadiene containing latexes and, in particular, carboxylated latexes such as carboxylated styrene-butadiene are particularly useful. The amount of the binder present in the coating composition may range from 5 parts or more, in particular from about 20 parts to about 60 parts, more particularly from about 25 parts to about 55 parts, and in accordance with certain embodiments of the present invention from about 30 to about 50 parts based upon the weight of the composition.

Latex 8879 from DOW/Styron and latex 5086 from Omnova are examples of commercially-available latexes that can be utilized in the present application. These latexes have a certain amount of carboxylation. Carboxylated latexes that are at least 2% carboxylated, more particularly from about 5-10% carboxylated or more, are particularly useful. Although not wishing to be bound by theory, it is theorized that carboxylated latexes in the range of above 5-10% carboxylation along with the increased hydroxyl groups in starch create better bonding sites with the vinyl groups of silicone formulations.

Latexes having a medium to high gel content are also particularly useful in accordance with certain aspects of the present invention. In accordance with certain embodiments, latex binders having a gel content of about 60-90%, more particularly from about 75-85% may be utilized.

In accordance with certain embodiments, the latex binder has a glass transition temperature (Tg) of between about −35° C. and about 30° C., typically between about −10° C. and about 20° C. In accordance with some embodiments, a latex binder is utilized wherein the binder has a mean particle size of less than about 200 nm, more typically from about 100 nm to 190 nm, and in certain cases from about 125 nm to 185 nm.

The choice of such latexes and starches along with a combination of the low surface energy magnesium silicate based hyperplatey talcs create better anchoring and therefore better curing silicone liner coated surfaces.

The base coating composition may also contain other components typically used in formulating paper coating compositions such as starch, clay, dispersants, pH modifiers, viscosity modifiers, etc. These components can be used in amounts typically used for paper coatings. In accordance with certain embodiments, maintaining the latex/hyperplaty talc/starch coatings below a pH level of about 8 can provide a better curing silicone coated substrate.

The base coating composition may be applied as a single coating or a plurality of coatings and may be applied on one or both sides of the liner substrate. Alternatively, the base coating composition may be applied to one surface of the substrate and the opposite surface may be provided with a back side coating that provides for curl control of the liner substrate. The base coating composition can be applied to the substrate by any suitable technique, such as cast coating, blade coating, air knife coating, rod coating, roll coating, gravure coating, slot-die coating, spray coating, dip coating, mayer rod coating, reverse roll coating, extrusion coating or the like. Furthermore, the coating compositions can be applied at the size press of a paper machine. The base coating composition and the backside coating composition can be applied at coat weights from about 1.5# to about 10#, more particularly from about 3# to about 7.5#, and in accordance with certain embodiments from about 2# to about 4# lbs/ream based on a ream size of 3000 ft$^2$.

The silicone composition can be applied to the paper substrate "on machine" or "off machine." Application of the silicone composition on machine means that the silicone composition is applied to the paper substrate as the paper substrate is formed. The phrase "off machine" means that one the paper substrate is formed, it is transferred to another line where the silicone composition is applied to the paper substrate. The equipment used in a particular operation may vary from facility to facility, but it is expected that many of the general operations will be present. In addition, it should be understood that various additional steps, if desired, can be included in the process.

The silicone composition can be applied to a surface of the paper substrate "on machine" at a size press or other type of coater. Exemplary coaters include puddle coaters, film coaters, blade coaters, gate roll coaters, three roll coaters, etc. Furthermore, the silicone composition can be applied to both sides of the paper substrate.

The silicone composition can be applied to the paper substrate "off machine" using a metering rod coater, gravure coater, multi-roll coater, or other type of coater. Silicone coaters are generally known and can be used to apply the silicone composition. In general, the silicone coater puts down the silicone composition, and causes the silicone composition to dry and/or allows it to cure. The silicone coater can apply the silicone composition to a substrate in an operation separate from the manufacture of the substrate itself.

The release liner substrate can pass through a coating station where the silicone composition is applied to the release liner substrate. The silicone composition can be applied to one or both sides of the release liner substrate. The surface of the release liner substrate that is processed to receive a silicone composition, and dried and cured, can be referred to as a release surface.

The substrate to receive a silicone composition can be staged at an unwind station of a coater and passed through the coating station where the silicone composition is applied. Optionally, the substrate may be printed at a print station. At the coating station the silicone composition may be applied at a desired coating weight determined by both substrate characteristics and end-use demands. For example, the silicone coating can be provided having a weight of about 0.2 lb/3,000 ft$^2$ to about 2.0 lb/3,000 ft$^2$. More particularly, the silicone coating can be provided in an amount of about 0.6 lb/3,000 ft$^2$ to about 1.5 lb/3,000 ft$^2$, and in certain cases from about 0.8 lb/3,000 ft$^2$ to about 1.0 lb/3,000 ft$^2$.

Upon exiting the coating station the substrate passes through an oven section that may be made up of several dryer zones. Heat in the oven section drives off any volatile components in the silicone composition and cures the coating to create a hard and durable surface that is low in surface energy so that other materials such as adhesives, resin fiber coatings, and foams, can be easily removed from the surface in subsequent manufacturing operations.

To cool the cured silicone coating, and the liner substrate to which it has been applied, the substrate can then pass through one or more cooling stations. Optionally, moisture can be added to the silicone coated substrate through the use of jet steamers. The coated, cured, and cooled product is then wound up at a wind-up station and removed from the coating machine.

It may be desirable to provide the release liner with differential release properties. That is, one side of the release liner may have a different surface energy than the other side of the release liner. By providing a release liner with differential release properties, it is possible for the release liner to exhibit a release preference where one side of the release liner is more likely to release than the other side of the release liner. As a result, different silicone compositions can be applied to the opposite sides of the release liner substrate.

In accordance with certain aspects of the present invention, the release liners area characterized by significantly reduced amounts of total extractables as compared to release liners prepared using conventional base coating compositions. The percent extractables provides an indication of the degree of cure of the silicone coating. The extractables correspond to uncrosslinked silicone that can be removed from the release-coated sample by a solvent, more completely cured coatings result in lower percent extractables. In accordance with certain embodiments, the release liner described herein may contain no more than about 5% extractables, more particularly no more than about 3% extractables, and in accordance with particular embodiments, no more than about 2% extractables by weight.

The percent extractables can be measured by using an XRF analyzer to determine the silicone coat weight of a sample before and after solvent extraction. The percent extractables equals the initial coat weight minus the final coat weight divided by the initial coat weight. The value can be expressed as a percentage by multiplying the result by 100.

An example of a test procedure that can be used to determine percent extractables is described below:
1. Coat substrate samples with silicone coating and dry coating.
2. Measure the silicone coat weight for each sample using an XRF analyzer.
3. If necessary, correct for any contribution to silicone coat weight from the substrate.
4. Place the samples in a solvent, such as methyl iso-butyl ketone (MIBK), for a standardized time period (e.g., 30 minutes)
5. Remove the samples from the solvent and dry the samples.
6. Measure the silicone coat weight for each extraction sample using the XRF analyzer, accounting for any silicone in the substrate, if necessary.
7. Calculate the percent extractables using the following equation:

% extractable silicone=[(Si(initial)−Si(final))/Si(initial)]*100 where:

Si(initial)=silicone coat weight before extraction; and
Si(final)=silicone coat weight after extraction.

The following examples are given to illustrate the certain aspects of the present invention and are not intended to be limiting upon the scope of the invention.

Base coating compositions containing standard talc (Heliocote-MT) were compared to coating compositions containing hyperplatey talc. Coating formulations used for the test are set forth below.

TABLE 1

Coating Formulations:

| Coating Formula | Comparative Example 1 7.5# (Dual Coating) (1st down/Top Ct) | Hyperplatey Talc Inventive Example 1 3.75# | Standard Talc Comparative Example 2 3.75# | Remake Hyperplatey Talc Inventive Example 2 3.75# |
|---|---|---|---|---|
| #2 Clay | 87.5/100 | | | |
| Latex 8879 | 12/30 | 30 | 30 | 30 |
| Dry Ansilex | 12.5 | | | |
| Starch | 6/2 | 6 | 6 | 6 |
| Dispex | 0.1/.1 | 0.1 | 0.1 | 0.1 |
| Kelgin | 0.2 | 0.2 | 0.2 | 0.2 |
| Ammonia | 0.2/.4 | 0.2 | 0.2 | 0.2 |
| Protein | 0/3 | | | |
| PP EXP 070 | | 100 | | 100 |
| Heliocote | | | 100 | |
| Silicone Formula | A | A | A | A |
| Extractables (%) | 4.30 | 1.23 | 2.94 | 0.93 |

***Back Side Coating same on all--#2 Clay-66.7 parts, Starch-33.3. Comparative Example 1 has 4# 1st down, 3.5# top ct. and 1.5# Back Side Coating. All coat weights are based on #/R for a ream size of 3000 ft^2
***PP EXP 070 and Heliocote samples have a single coat layer of 3.75# front side and 1.5# back side coating.

TABLE 2

Single Coating Formulations:

| Front Side Coating Formula | Comparative Example 3a | Comparative Example 3b | Inventive Example 3 Hyperplatey Talc | Comparative Example 4 Standard Talc | Comparative Example 5 Standard Talc 3# | Inventive Example 4 Hyperplatey Talc 3# |
|---|---|---|---|---|---|---|
| EGC | 100 | 100 | | | | |
| Starch | 10 | 10 | 10 | 10 | 10 | 10 |
| Latex (5086) | 40 | 40 | 40 | 40 | 40 | 40 |
| PP EXP 070 | | | 100 | | | 100 |
| Heliocote | | | | 100 | 100 | |
| Coat Weight | 6# | 6# | 6# | 6# | 3# | 3# |
| Silicone Formula | A | B | A | A | A | A |
| Extractables (%) | 5.24 | 5.16 | 2.90 | 2.48 | 4.92 | 2.56 |

***Back Side Coating same on all - EGC-95 parts, CGC-5, Starch-40, Latex 5086-25, Sunrez-2 1# Coat Weight on back side
[EGC Englehard Clay, CGC—Coarse ground carbonate, ADM Ethylated starch, Sunrez-Coating lubricant]

Test results for the silicone coated release liner substrates are provided in Table 3.

TABLE 3

Silicone Curing Results:

| Rhodia solventless | Paper Coating Ct. Wt. (#/R) | Si. Ct. wt. (#/R) | % Extractables | Average |
|---|---|---|---|---|
| Comparative Example 1 Formula A | 7.5# | 0.93 Rhodia | 4.30 4.30 4.30 | 4.30 |
| Inventive Example 1 Formula A | 3.75# | 0.81 Rhodia | 1.22 1.22 1.25 | 1.23 |
| Comparative Example 2 Formula A | 3.75# | 0.90 Rhodia | 1.15 3.37 4.30 | 2.94 |
| Inventive Example 2 Formula A | 3.75# | 0.72 Rhodia | 1.41 1.39 0.00 | 0.93 |
| Comparative Example 3a Formula A | 6# | 0.83 Rhodia | 7.32 4.71 3.70 | 5.24 |
| Comparative Example 3b Formula B | 6# | 0.84 Rhodia | 5.95 4.76 4.76 | 5.16 |
| Inventive Example 3 Formula A | 6# | 0.81 Rhodia | 2.47 2.44 3.80 | 2.90 |
| Comparative Example 4 Formula A | 6# | 1.07 Rhodia | 2.78 1.89 2.78 | 2.48 |
| Comparative Example 5 Formula A | 3# | 0.82 Rhodia | 6.25 3.57 4.94 | 4.92 |
| Inventive Example 4 Formula A | 3# | 0.91 Rhodia | 3.30 2.13 2.25 | 2.56 |

Samples were tested 30 min post cure/30 min MIBK extractor. Silicone coat weights were determined using XRF analyzer, lb/ream (3000 ft$^2$). Samples were cured for 30 s at 150° C. Formula A was Rhodia silicone 100 pts PC 262, 3.5 pts PC 397A, and 5.45 pts PC 370 as received. Formula B was Rhodia silicone 100 pts PC 262, 3.4 pts PC 397A, and 4.0 pts PC 370 as received. Components A and B are solventless silicones from Rhodia (now Bluestar) and these formulations are generally used in the industry.

As indicated in Table 3, the substitution of hyperplatey talc in the current coating formulations substantially improves the silicone curing even at half the current coat weights for both liner grades tested. In general, hyperplatey talc provides improved performance over standard heliocote talc.

Paper properties for the two release liner substrates tested are provided in Tables 4 and 5.

TABLE 4

Study Paper Property Results

|  |  | Comparative Example 1 | Inventive Example 1 | Inventive Example 2 | Comparative Example 2 |
|---|---|---|---|---|---|
| Front side Ct. Wt. | Lbs/3000 ft$^2$ | 7.5# dual | 3.75# | 3.75# | 3.75# |
| Back side Ct. Wt. | Lbs/3000 ft$^2$ | 1.5# | 1.5# | 1.5# | 1.5# |
| Caliper | mils | 2.83 | 2.82 | 2.68 | 2.74 |
| Opacity |  | 80.7 | 78.9 | 79.3 | 75.5 |
| PPS, μm | Front | 3.65 | 5.69 | 3.40 | 4.96 |
| PPS, μm | Back | 6.69 | 6.39 | 6.25 | 6.37 |
| HPD porosity, TAPPI Method T460 om-96 | Secs/10 ml | 206 | 13 | 29 | 38 |
| Gloss, % TAPPI Method T480-om-92 | Front | 21.0 | 7.5 | 9.9 | 13.5 |
| Gloss, %, TAPPI Method T480-om-92 | Back | 7.8 | 7.8 | 8.5 | 7.8 |
| Brightness, % GE T452 om-98 | Front | 78.10 | 78.24 | 79.59 | 79.40 |
| Brightness, % GE | Back | 79.65 | 80.79 | 81.40 | 80.84 |
| L, Hunter | Front | 91.77 | 88.64 | 89.18 | 90.44 |
| L, Hunter | Back | 91.15 | 90.19 | 90.45 | 91.04 |
| a color, Hunter | Front | −0.39 | 0.07 | 0.22 | −0.08 |
| a color, Hunter | Back | 0.02 | 0.00 | 0.06 | −0.01 |
| b color, Hunter | Front | 5.62 | 1.02 | 0.79 | 2.73 |
| b color, Hunter | Back | 3.47 | 1.27 | 1.20 | 2.46 |
| Cobb Unger-castor oil absorption, | g/m$^2$ | 6.1 | 18.5 | 11.0 | 7.6 |
| Cobb-water TAPPI Method 441 om-98 | g/m$^2$ | 22.6 | 30.6 | 21.4 | 28.6 |

TABLE 5

Study Paper Property Results:

|  |  | Comparative Example 3 | Inventive Example 3 | Comparative Example 4 | Inventive Example 4 | Comparative Example 5 |
|---|---|---|---|---|---|---|
| Front side Ct. Wt. | lbs/3000 ft$^2$ | 6# | 6# | 6# | 3# | 3# |
| Back side Ct. Wt. | lbs/3000 ft$^2$ | 1.5# | 1.5# | 1.5# | 1.5# | 1.5# |
| Caliper, TAPPI Test Method 411 om-89 | μm | 2.23 | 2.22 | 2.26 | 2.13 | 2.16 |
| Opacity, TAPPI method T425 om-96 | % | 66.4 | 68.2 | 66.4 | 64.3 | 65.6 |
| PPS TAPPI test method T555 pm-94 | Front | 1.93 | 2.52 | 2.18 | 2.20 | 2.04 |

TABLE 5-continued

Study Paper Property Results:

| | | Comparative Example 3 | Inventive Example 3 | Comparative Example 4 | Inventive Example 4 | Comparative Example 5 |
|---|---|---|---|---|---|---|
| PPS, TAPPI test method T555 pm-94 | Back | 2.93 | 3.20 | 3.29 | 2.55 | 3.11 |
| HPD TAPPI Method T460 om-96 | | 5272 | 379 | 2954 | 221 | 684 |
| Gloss, TAPPI Method T480-om-92 | Front | 59.8 | 37.1 | 38.9 | 39.9 | 41.1 |
| Gloss, TAPPI Method T480-om-92 | Back | 33.3 | 26.7 | 25.9 | 34.6 | 27.6 |
| Brightness, % GE T452 om-98 | Front | 77.5 | 74.8 | 75.1 | 75.3 | 78.1 |
| Brightness | Back | 77.5 | 76.8 | 77.9 | 77.4 | 79.7 |
| L, Hunter | Front | 91.8 | 88.1 | 90.3 | 88.6 | 91.5 |
| L | Back | 91.8 | 89.3 | 91.4 | 89.8 | 92.1 |
| a color, Hunter | Front | −0.71 | −0.42 | −0.66 | −0.46 | −0.58 |
| a color, Hunter | Back | −0.61 | −0.53 | −0.60 | −0.54 | −0.55 |
| b color, Hunter | Front | 6.10 | 2.97 | 5.89 | 3.26 | 5.14 |
| b color | Back | 6.00 | 3.08 | 5.16 | 3.37 | 4.83 |
| Cobb Unger-castor oil, proprietary | Gms/m^2 | 1.0 | 1.9 | 1.0 | 2.3 | 1.3 |
| Cobb-water, TAPPI Method 441 om-98 | | 65.2 | 73.2 | 63.4 | 49.7 | 44.6 |

The present invention has been described in detail with specific reference to particular embodiments thereof, but it will be understood that variations and modifications can be effected within the spirit and scope of the invention.

What is claimed is:

1. A release liner comprising a substrate base and a coating on the substrate base wherein the coating comprises a latex binder and hyperplatey talc; and
    a silicone coating on said substrate coating, wherein the latex binder has a gel content from about 60% to 90%.

2. The release liner in accordance with claim 1 wherein the binder comprises a carboxylated latex binder.

3. The release liner in accordance with claim 2 wherein the binder has a carboxylation percentage of between about 5 to 10%.

4. The release liner in accordance with claim 2 wherein the binder comprises a carboxylated styrene butadiene latex binder.

5. The release liner in accordance with claim 4 wherein the latex binder has a gel content from about 75% to 85%.

6. The release liner in accordance with claim 4 wherein the latex binder has a particle size in the range of 100-200 nm.

7. The release liner in accordance with claim 5 wherein the silicone coating contains no more than about 3% extractables.

8. The release liner in accordance with claim 2 wherein the substrate base comprises cellulose fibers.

9. The release liner in accordance with claim 2 wherein the silicone coating is present in a coat weight of from about 0.5 to about 1.5 lbs./ream.

10. The release liner in accordance with claim 2 wherein the silicone coating contains no more than about 5% extractables.

11. The release liner in accordance with claim 2 wherein the silicone coating contains no more than about 3% extractables.

12. A release liner comprising a substrate base and a coating on the substrate base wherein the coating comprises a carboxylated styrene butadiene binder and hyperplatey talc; and
    a silicone coating on said substrate coating,
    wherein the binder has a gel content from about 60% to 90% and a carboxylation percentage of between about 5 to 10% and the hyperplatey talc has an aspect ratio of at least 60.

13. The release liner in accordance with claim 12 wherein the silicone coating contains no more than about 5% extractables.

14. The release liner in accordance with claim 12 wherein the silicone coating contains no more than about 3% extractables.

15. The release liner in accordance with claim 12 wherein the binder has a glass transition temperature (Tg) of between about −35° C. and about 30° C.

* * * * *